United States Patent [19]
Etienne

[11] 4,127,803
[45] Nov. 28, 1978

[54] CHARGING CIRCUIT FOR AN AUXILIARY BATTERY ON AN ELECTRICALLY-PROPELLED VEHICLE

[75] Inventor: Michel Etienne, Valmondois, France
[73] Assignee: Automobiles Peugeot, Paris, France
[21] Appl. No.: 798,309
[22] Filed: May 19, 1977
[30] Foreign Application Priority Data May 26, 1976 [FR] France ............................ 76 15959

[51] Int. Cl.² .................................................. H02J 7/00
[52] U.S. Cl. .............................................. 320/2; 320/6;
307/149; 318/139
[58] Field of Search ................................... 320/2-5,
320/14, 15, 56, 61, 51; 318/139; 307/149, 150

[56] References Cited

U.S. PATENT DOCUMENTS

| | | | |
|---|---|---|---|
| 3,321,688 | 5/1967 | von Delden | 318/138 |
| 3,560,832 | 2/1971 | Kirk | 320/15 X |
| 3,586,954 | 6/1971 | Carves | 320/56 X |
| 3,820,000 | 6/1974 | Smith | 307/149 X |
| 3,987,352 | 10/1976 | Hirota | 320/3 |

*Primary Examiner*—Robert J. Hickey
*Attorney, Agent, or Firm*—Burns, Doane, Swecker & Mathis

[57] ABSTRACT

The charging circuit is for charging an auxiliary battery of a vehicle which is driven by an electric motor supplied with current by a main battery through a supply circuit comprising a device for chopping the battery voltage during the vehicle starting and braking stages. This charging circuit comprises a transformer whose primary winding is inserted in the aforementioned supply circuit of the motor and supplied with current by the chopper device. The secondary winding of the transformer is connected to supply current to the auxiliary battery through a rectifier device.

6 Claims, 5 Drawing Figures

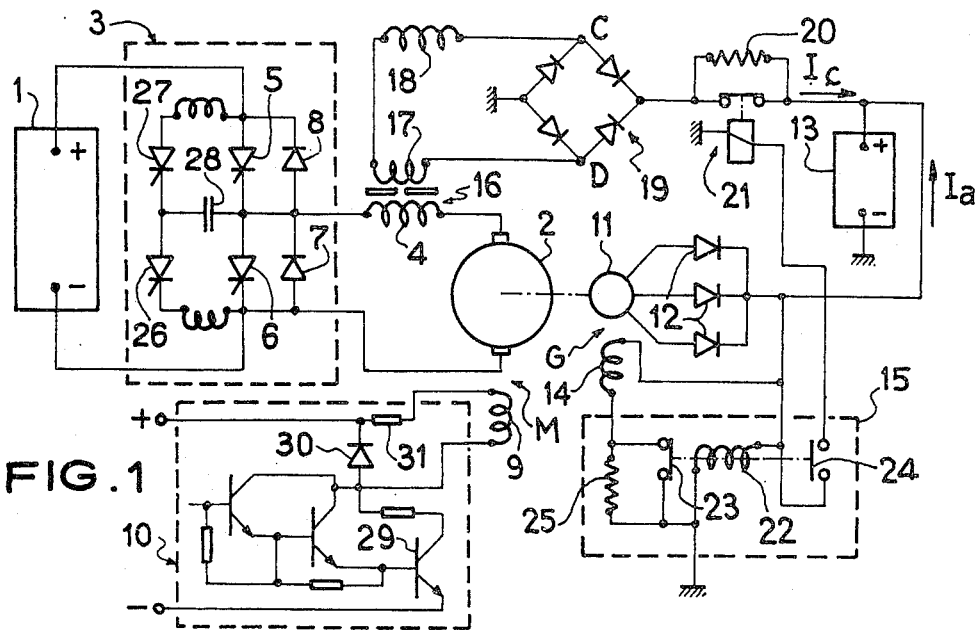
FIG.1
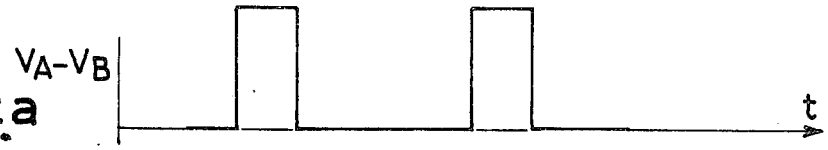
FIG.2a $V_A-V_B$
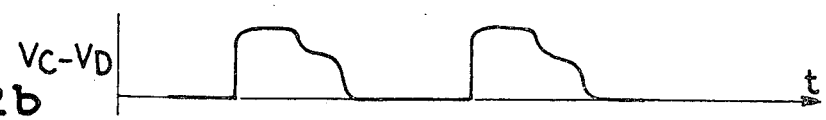
FIG.2b $V_C-V_D$
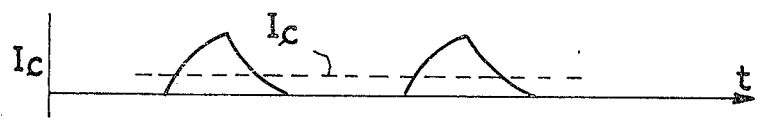
FIG.2c $I_c$
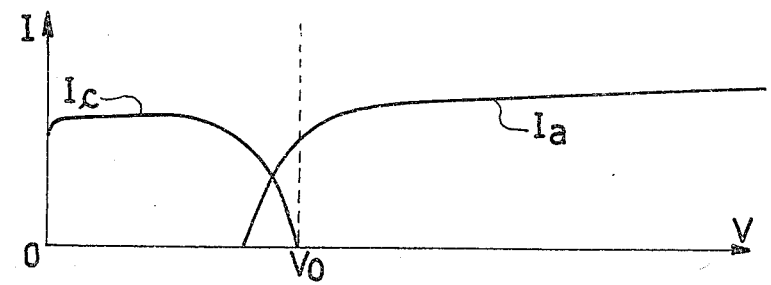
FIG.3

CHARGING CIRCUIT FOR AN AUXILIARY BATTERY ON AN ELECTRICALLY-PROPELLED VEHICLE

The present invention relates to a circuit for charging an auxiliary battery on an electically-propelled vehicle.

In an electrically-propelled vehicle the use of a standard generator driven by the propelling motor is insufficient to sufficiently recharge the auxiliary battery owing to the fact that the generator only supplies current when the vehicle reaches a certain speed.

An object of the invention is to provide a circuit for charging the auxiliary battery at low speeds of rotation of the propelling motor in respect of which the generator produces no current or insufficient current.

According to the invention, there is provided a charging circuit for an auxiliary battery for a vehicle propelled by an electric motor supplied with current by a main battery through a supply circuit comprising a device which chops the battery voltage during the vehicle starting and braking stages, said charging circuit comprising a transformer whose primary winding is inserted in the supply circuit of the motor and is supplied with current by said device for chopping the voltage of the main battery and whose secondary winding supplies current to the auxiliary battery through a rectifier device.

According to a feature of the invention in the case where the motor is supplied with current in series through an inductor for smoothing the current furnished by the chopper device, said smoothing inductor is constituted by the primary winding of the transformer.

Further features and advantages of the invention will be apparent from the ensuing description with reference to the accompanying drawing in which:

FIG. 1 is a diagram of the electric circuit of an electrically-propelled vehicle comprising the charging circuit according to the invention;

FIG. 2a is a diagram representing the variation in the voltage between the points A and B of the circuit shown in FIG. 1 during the starting or braking stages;

FIG. 2b is a diagram representing the variation in the voltage applied by the secondary winding of the transformer across the points C and D of the circuit shown in FIG. 1;

FIG. 2c is a diagram representig the variation in the intensity of the charging current furnished by the circuit according to the invention, and FIG. 3 is a diagram representing, as a function of the speed of rotation of the propelling motor, the variation in the intensity of the charging current due to the circuit according to the invention on one hand and due to the alternator on the other.

With reference to FIG. 1, the illustrated circuit comprises a main battery 1 connected to the armature 2 of a d.c. electric motor M for propelling a vehicle, through a device 3 for chopping the battery voltage and through an inductor 4 for smoothing the currrent furnished by this chopper device connected in series with the armature 2. The chopper device 3 is of conventional type and comprises, for example, a driving thyristor 5 connected in series with the armature 2 between the positive terminal of the battery 1 and the smoothing inductor 4, and a braking thyristor 6 connected in parallel between the points A and B in the series circuit formed by the inductor 4 and the armature 2. This device 3 also comprises a driving diode 7 and a braking diode 8 which are respectively connected in parallel with the thyristors 6 and 5 with a direction of conduction which is the reverse of that of the latter, and conventional thyristor initiating and cutoff circuits (not shown). The capacitor 28 is charged and discharged by the thyristors 26 and 27. Moreover, in the illustrated embodiment, the motor M has a separate excitation and comprises a field winding 9 connected to a conventional excitation control device 10. The excitation device 10 comprises a transistor 29 opening and closing in accordance with the required excitation current of the motor. The emitter-collector path of the transistor 29 is connected in series with a diode 31 to the terminals of the battery 1. The field winding 9 is connected in series with a resistor 31 which determines the excitation current. The diode 30 is subjected to the current of the excitation winding at the moment of the cut-off of the circuit by the transistor 29. However, the type of electric motor employed is not critical and a series-wound motor for example could also be used.

The armature 2 of the motor drives the rotor 11 of a three-phase alternator G each of the three phases of which comprises at least one rectifying diode 12 and is connected to the positive terminal of an auxiliary battery 13. In a conventional manner, the excitation winding 14 of the alternator is connected to the battery 13 and to a regulator 15.

The charging circuit according to the invention comprises a transformer 16 whose primary winding is constituted by the smoothing inductor 4 and whose secondary winding 17 is connected, through an inductor 18 regulating the charging current of the auxiliary battery 13, to the input terminals C, D of a double half-cycle rectifying diode bridge 19. The output of this bridge 19 is connected to the auxiliary battery 13 through a resistor 20 for limiting the charging current. This resistor 20 is normally shunted by the moving contact of a switch 21 which is here an electromechanical relay controlled by the regulator 15.

The regulator 15 comprises a coil 22 to which the voltage of the auxiliary battery 13 is applied and two moving contacts 23 and 24 which are actuated simultaneously by the coil 22 and are adapted respectively to shunt a resistor 25 for limiting the excitation current of the alternator connected in series with the winding 14, and to apply the voltage of the battery 13 to the relay 21.

The circuit shown in FIG. 1 operates in the following manner:

During the vehicle starting or braking stages, the voltage of the battery 1 is chopped by the device 3 in the known manner. This pulsating voltage, the form of which is represented in the diagram of FIG. 2a, is applied to the armature 2 through the inductor 4. The secondary winding 17 of the transformer 16 furnishes an alternating voltage whose frequency is variable and equal to the frequency of pulsation of the pulsating undulating current passing through the armature 2 of the motor. This voltage is adjusted by the inductors 17 and 18 and the voltage obtained between the points C and D shown in FIG. 2b is rectified by the diode bridge 19 which furnishes a current Ic (2c) for charging the auxiliary battery 13.

Up to the neighbourhood of a value Vo, the speed of the motor is controlled by the voltage applied to the armature 2 of the motor and, beyond this value, the speed of the motor is controlled by acting on its excitation. As the value Vo is approached, the frequency of the pulsating voltage increases and consequently the current Ic decreases. When the speed Vo is reached, the thyristor 5 permanently conducts and the voltage at the terminals of the secondary winding 17 and the current Ic become zero. However, the alternator starts to supply a current Ia below this speed Vo, that is to say, at a speed of about 800 rpm and gradually takes over from the charging circuit of the invention for supplying current to the auxiliary battery 13, as shown in the diagram of FIG. 3 representing the respective configurations of the currents Ic and Ia as a function of the speed of the motor. This diagram shows that, with the circuit according to the invention, a sufficient charging current is permanently furnished to the auxiliary battery 13.

As long as the voltage of the battery 13 does not exceed a predetermined threshold value, the regulator 15 is at rest and the moving contacts are in the position shown in FIG. 1. When the voltage of the battery 13 exceeds this threshold value, the coil 22 shifts the moving contacts and this, on one hand, connects the resistor 25 in series with the inductor 14 and, on the other, excites the relay 21 which puts the resistor 20 in circuit. If the motor is at that time in the range of operation between a zero speed and the speed Vo, the fact that the resistor 20 is put in circuit causes the current Ic to drop. On the other hand, if the motor is in the range of operation in which its speed is higher than Vo, the fact that the resistor 25 is put in series with the inductor 14 reduces in the conventional manner the current supplied by the alternator. In both cases the regulator remains in operation until the voltage of the battery 13 redescends below the aforementioned threshold value.

The charging circuit according to the invention has the advantage of employing a small number of components, particularly owing to the fact that the smoothing inductor 4 is employed as the primary winding of the transformer 16.

Having now described my invention what I claim as new and desire to secure by Letters Patent is:

1. In a circuit for charging an auxiliary battery for a vehicle driven by an electric motor supplied with current by a main battery through a supply circuit comprising a device for chopping the battery voltage during the vehicle starting and braking stages, the improvement comprising a transformer having a primary winding which is inserted in the supply circuit of the motor and is connected to be supplied with current by said device for chopping the voltage of the main battery, the transformer having a secondary winding which is connected to supply current to the auxiliary battery by a circuit including a rectifier device.

2. A circuit as claimed in claim 1, wherein the motor is supplied with current in a series circuit comprising an inductor for smoothing the current furnished by the chopping device, said smoothing inductor constituting the primary winding of the transformer.

3. A circuit as claimed in claim 1, comprising an inductor for regulating the charging current of the auxiliary battery and connected in series between the secondary winding of the transformer and the rectifier device.

4. A circuit as claimed in claim 1, comprising a resistor for limiting the charging current of the auxiliary battery and connected in series between the rectifier device and the auxiliary battery.

5. A circuit as claimed in claim 4, further comprising in combination a generator connected to be driven by the motor and connected to charge the auxiliary battery, a regulator of the charging current furnished by said generator to the auxiliary battery, and a normally-closed switch adapted to shunt said resistor, said regulator being capable of controlling the opening of said switch for putting said resistor in circuit when the voltage of the auxiliary battery exceeds a predetermined threshold value.

6. A circuit as claimed in claim 5, wherein said switch is an electromechanical relay.

* * * * *